Figure 1:
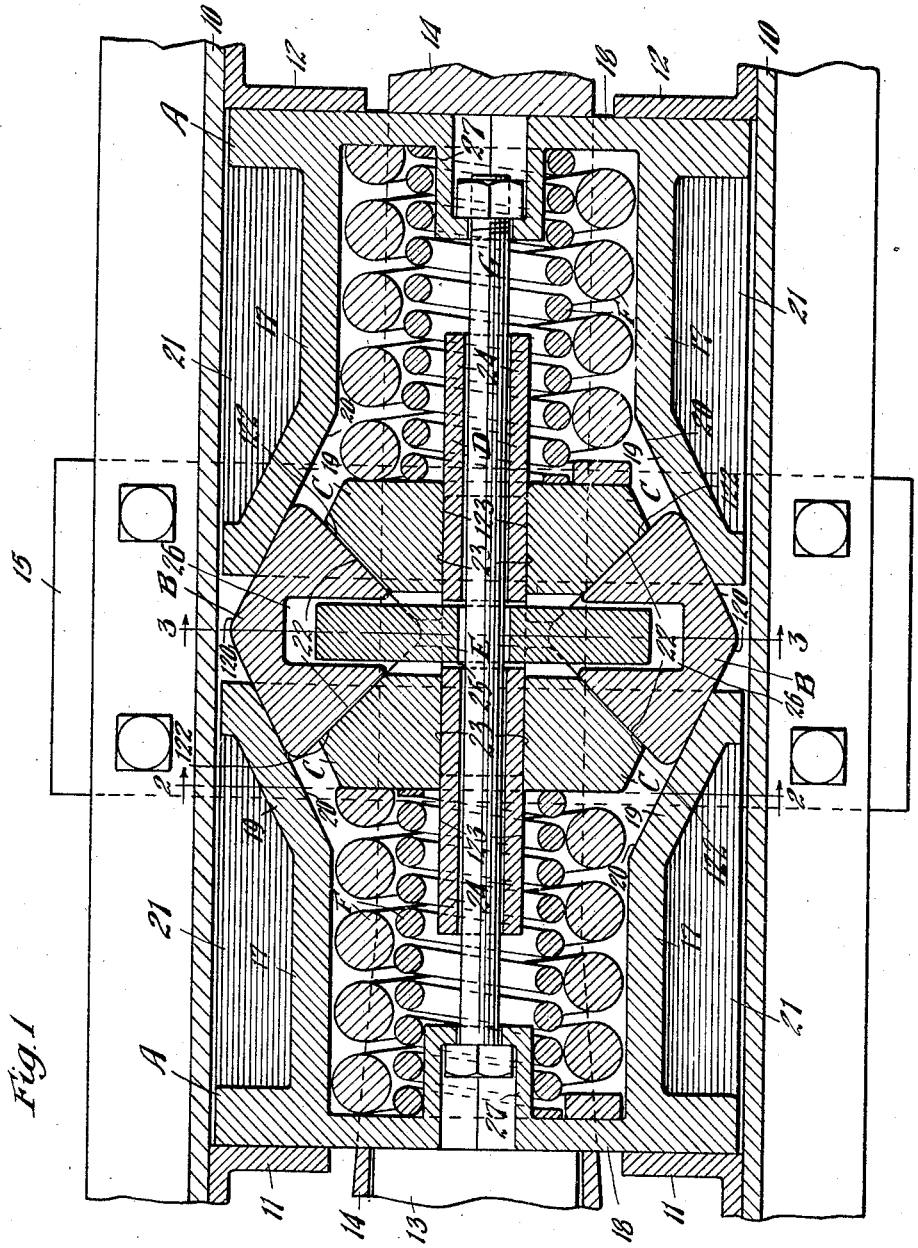

Nov. 2, 1926.

S. B. HASELTINE 1,605,024

FRICTION SHOCK ABSORBING MECHANISM

Filed Sept. 12, 1924    2 Sheets-Sheet 1

Witnesses
Wm. Geiger

Inventor
Stacy B. Haseltine
By George Haight
His Atty.

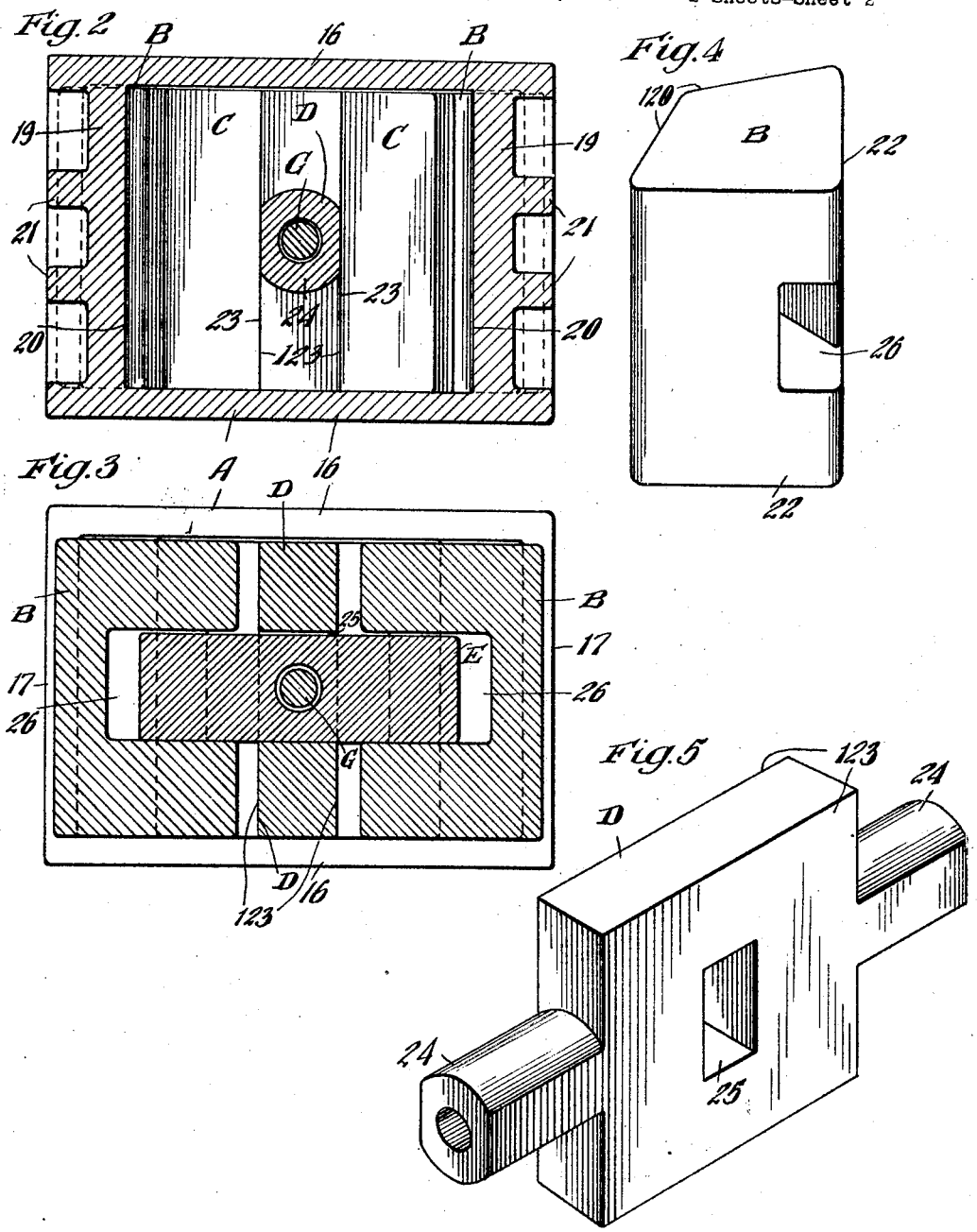

Patented Nov. 2, 1926.

1,605,024

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 12, 1924. Serial No. 737,349.

Another object of the invention is to provide a mechanism of the character indicated, comprising relatively movable end followers and a friction wedge system including a friction element having longitudinally disposed friction surfaces, wherein the followers are provided with wedge means co-operating with the friction system.

Other objects and advantages of the invention will more clearly and fully appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figures 4 and 5 are detail, perspective views respectively of a wedge block and a friction element used in connection with my improved mechanism.

In said drawings, 10—10 denote channel-shaped center or draft sills of a railway car underframe to the inner faces of which are secured front stop lugs 11—11 and rear stop lugs 12—12. The inner end portion of the drawbar is indicated at 13 to which is operatively connected a hooded yoke 14 of usual construction. Within the yoke is disposed the shock absorbing mechanism proper. The yoke and the parts therewithin are supported in operative position by a detachable saddle plate 15.

The improved shock absorbing mechanism proper as shown comprises broadly front and rear follower casings A—A; two wedge blocks B—B; four friction wedge shoes C—C; a friction element D; a locking bar E; spring resistance elements F—F; and a retainer bolt G.

The front and rear follower casings A are of generally rectangular form and have spaced top and bottom walls 16—16; spaced side walls 17—17 and a transverse end wall 18, the end wall 18 extending at opposite sides beyond the side walls 17 and being thickened as shown and co-operating with the corresponding stop lugs of the draft sills. The side walls 17, at the inner end of each casing are flared laterally as indicated at 19 providing interior opposed wedge faces 20 diverging inwardly of the mechanism. The casings A are preferably reinforced by webs 21 extending longitudinally thereof between the end walls and the flared portions of the side walls.

The wedge blocks B, which are two in number, are disposed on opposite sides of the mechanism, each block co-operating with the wedge faces 20 of the front and rear casings A at the corresponding side of the mechanism. The blocks B are of like construction and each is provided with a pair of outer wedge faces 120 correspondingly inclined to and adapted to co-operate with the wedge faces 20 of the front and rear casings, respectively. On the inner side, that is, the side nearest the axis of the mechanism, each of the blocks B is provided with a pair of front and rear wedge faces 22, adapted to co-operate with the corresponding set of friction shoes C. The wedge faces 22 and 120 at the corresponding end of each block B converge outwardly as clearly shown in Figures 1 and 4.

The friction wedge shoes C, which are four in number, are also of like construction, each shoe being provided with a flat friction face 23 on the inner side thereof adapted to co-operate with the friction element D. Each shoe is also provided with an outer wedge face 122 correspondingly inclined to and adapted to co-operate with one of the wedge faces 22 of the adjacent block B. As will be clear upon reference to Figure 1, the shoes C are arranged in pairs, one pair co-operating with the front wedge faces 22 and the other pair co-operating with the rear wedge faces 22 of the wedge blocks B.

The friction element D is in the form of a relatively heavy, rectangular block having vertically disposed, longitudinally arranged friction surfaces 123 at the opposite sides thereof adapted to respectively co-operate with the friction surfaces 23 of the shoes C at the opposite sides of the mechanism. The element D is provided with cylindrical extensions 24 at the front and rear ends thereof, the extensions 24 being provided with flat side faces, the flat faces of the front and rear extensions forming continuations of the side friction surface 123 and adapted to function as guides to prevent tilting of the shoes C during their outward movement away from each other. The friction element D and the wedge blocks B are maintained in centered relation with reference to each other by means of the locking bar E which extends through a rectangular opening 25 provided in the element D, and having its opposite ends extending into openings 26 provided in the respective wedge blocks B, the bar E having a loose working fit in said openings 26 to permit relatively free lateral approach of the blocks B and still prevent appreciable displacement thereof longitudinally of the mechanism with reference to the friction element D.

The spring resistance elements F are tandem arranged, one of the same being disposed in each of the casings A and having its opposite ends bearing respectively on the end wall 18 of the casing and the outer end faces of a pair of the friction wedge shoes C. Each spring resistance element F comprises a relatively light inner coil and a relatively heavy outer coil, the inner coil being held in central position by the corresponding projection 24 on the friction element D and a hollow boss 27 inwardly projecting from the end wall 18 of the corresponding casing. In the normal full release position of the parts, a clearance is provided between the front and rear ends of the friction element D and the inner ends of the front and rear spring resistance elements F, thereby allowing the initial compresssion on the latter to the various wedging faces in close relation as wear develops thereon.

The retainer bolt G has its opposite ends anchored in the hollow bosses 27 of the front and rear follower casings respectively and serves to maintain the parts in assembled relation and under initial compression. The shank of the bolt extends through aligned openings provided in the element D and the locking bar E.

As wear occurs on the various friction and wedge surfaces, compensation therefor will be had by the springs, which are under compression, forcing the shoes C toward each other, sufficient clearance being provided between the inner ends of the shoes and the locking bar E to allow for this movement.

The operation of my improved shock absorbing mechanism is as follows, assuming a compression stroke. The front and rear follower casings A will be moved relatively toward each other, compressing the front and rear spring resistance elements F and effecting a wedging action between the wedge faces of the casings and the wedge blocks B, forcing the latter laterally toward each other, wedging the front and rear friction shoes C apart and effecting an additional compression of the spring resistance elements. As the friction shoes C are moved apart, friction will be created between the same and the surfaces 123 of the friction element D in addition to the friction created between the wedge faces of the blocks B and the wedge faces of the casings A and shoes C, respectively. The described action will continue until the actuating force is reduced or the inner ends of the front and rear casings come into abutment. In the latter case, the casings A will function as a solid column for transmitting the pressure directly to the corresponding stop lugs. It will be evident that the casings A coming into abutment, will limit the compression of the springs F, thereby preventing the same from being injured by being driven solid.

When the actuating pressure is reduced, the springs will force the follower casings apart, reducing the wedging action on the blocks B, permitting the springs to force the shoes C toward each other and return the parts to normal position.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with relatively movable follower acting members, each of said members having wedge faces thereon; of a pair of wedge blocks each having wedge faces co-operating with said front and rear follower members, said blocks being adapted to be moved toward each other during the relative approach of the followers; a pair of friction wedge shoes co-operating with the front and rear ends of each wedge block; a friction element having elongated friction surfaces co-operating with all of said shoes; and a main spring resistance co-operating with each follower member and the friction shoes at the corresponding ends of the wedge blocks.

2. In a friction shock absorbing mechanism, the combination with relatively movable front and rear follower acting casings, each casing having a plurality of interior wedge faces; of a spring resistance in each casing; wedge blocks interposed between said casings and co-operating with the wedge faces thereof; a friction element interposed between said wedge blocks, said element having friction surfaces disposed longitudinally of the mechanism; and a plurality of friction shoes co-operating with said wedge blocks, each shoe having a friction face co-operating with one of the friction surfaces of said element.

3. In a friction shock absorbing mechanism, the combination with relatively movable front and rear followers; of a wedge block disposed at each side of the mechanism, said blocks and followers having co-operating wedge face thereon for forcing said wedge blocks relatively toward each other upon relative approach of said followers; a longitudinal friction element relatively to which both of said followers are movable; friction wedge shoes co-operating with said element and blocks; and means for yieldingly resisting movement of said shoes.

4. In a friction shock absorbing mechanism, the combination with front and rear follower casings having opposed wedge faces on the interior thereof; of a pair of wedge blocks at opposite sides of the mechanism interposed between said follower casings and co-operating with the wedge faces thereof; a central friction element having longitudinally disposed friction surfaces on opposite sides thereof; a plurality of friction wedge shoes co-operating with each friction surface of said element and having wedging engagement with the wedge block at the corresponding side of the mechanism; and a main spring resistance element within each casing and co-operating with the friction wedge shoes at the corresponding end of the mechanism.

5. In a friction shock absorbing mechanism, the combination with front and rear follower casings having interior opposed wedge faces at the inner ends thereof; a longitudinally disposed friction element interposed between said casings; a plurality of friction wedge shoes co-operating with said friction element; a spring resistance within each casing co-operating with the corresponding friction shoes; a pair of wedge blocks co-operating with the friction shoes, said blocks being interposed between the front and rear follower casings and having wedge faces co-operating with the wedge faces of said casings.

6. In a friction shock absorbing mechanism, the combination with front and rear follower casings, relatively movable toward and from each other; a pair of wedge blocks interposed between said casings, said blocks and casings having co-operating wedge faces; a friction wedge system co-operating with said wedge blocks, said system including a longitudinally disposed friction element; and means co-acting with said friction element and wedge blocks for maintaining the same in relatively centered relation.

In witness that I claim the foregoing I have hereunto subscribed my name this 4th day of September 1924.

STACY B. HASELTINE.